(No Model.)
P. J. SCHLICHT.
ATTACHMENT FOR APPLICATION TO APPARATUS FOR PRODUCING COMBUSTION
No. 556,286. Patented Mar. 10, 1896.
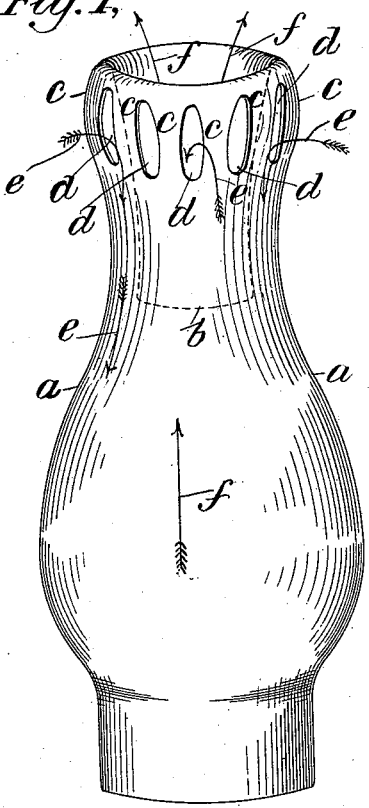
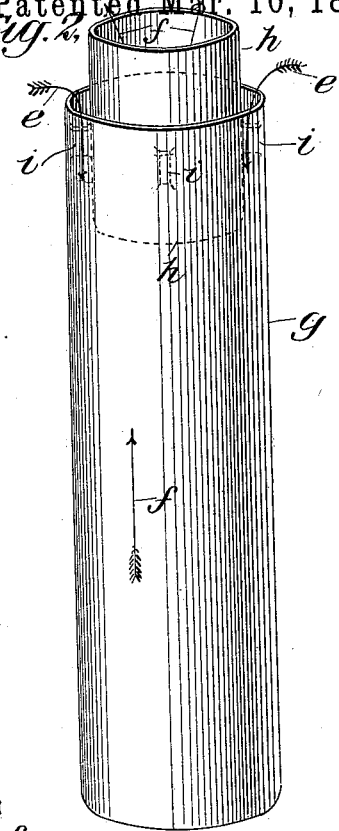
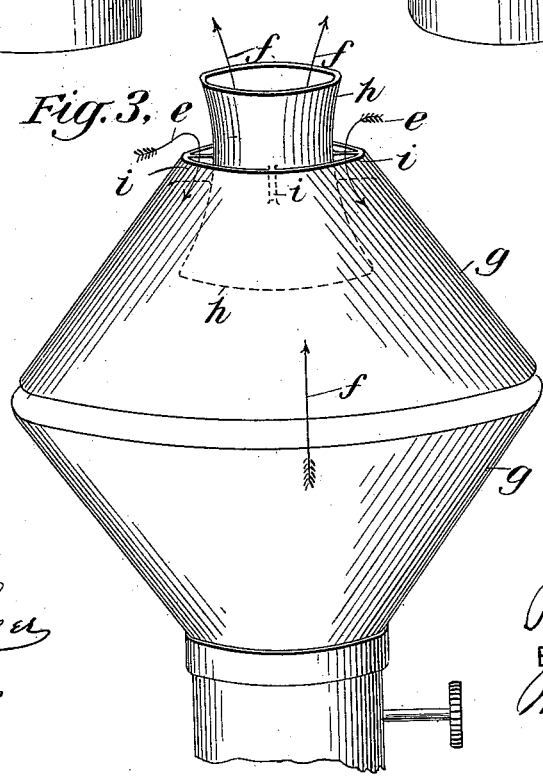
WITNESSES:
Edwin Seger
Sidney Mann
INVENTOR
Paul J. Schlicht,
BY
Witter & Kenyon,
ATTORNEYS.

UNITED STATES PATENT OFFICE.

PAUL J. SCHLICHT, OF SUMMIT, NEW JERSEY, ASSIGNOR TO EDMUND FRANCIS ELDREDGE, OF NEW YORK, N. Y.

ATTACHMENT FOR APPLICATION TO APPARATUS FOR PRODUCING COMBUSTION.

SPECIFICATION forming part of Letters Patent No. 556,286, dated March 10, 1896.

Application filed January 14, 1896. Serial No. 575,490. (No model.)

*To all whom it may concern:*

Be it known that I, PAUL J. SCHLICHT, a citizen of the United States, residing at Summit, in the county of Union and State of New Jersey, have invented a new and useful Article of Manufacture Consisting of an Attachment to be Applied to Apparatus for Producing Combustion, of which the following is a full, clear, and exact specification, reference being had to the accompanying drawings, which form a part hereof.

My invention relates to means for carrying out the improved method of producing combustion described in my earlier application, Serial No. 523,782, and its object is to provide an attachment which can be readily applied to combustion apparatus, and which when so applied will enable my improved method of producing combustion to be carried out in said apparatus, and which can be made as a separate article of manufacture.

My improvement is particularly applicable to lamps.

My invention consists broadly in a new article of manufacture comprising a chimney or globe provided with a deflector or suitable means for causing air to flow downward within the chimney or globe to the place of combustion, so as to come in contact with the hot products of combustion, the said article being adapted to be applied to combustion apparatus and especially to lamps.

In the preferred form of my invention the deflector is made integral with the chimney or globe.

My invention also consists in a new article of manufacture comprising a lamp chimney or globe made of glass provided with a glass deflector made integral therewith for causing air to flow downward within the chimney or globe to the place of combustion or to the burner, so as to come in contact with the hot products of combustion and thereby carry out the method of producing combustion fully explained in my earlier application.

My invention also consists in certain other features of construction and combinations of parts hereinafter described and claimed.

My invention is fully shown in the accompanying drawings, in which—

Figure 1 is a perspective view of one form of my improved lamp-chimney. Fig. 2 is a perspective view of another form, and Fig. 3 is a perspective view of a lamp-globe embodying my improvement.

In Fig. 1, *a* is the lamp-chimney proper. It is made of glass and increases in diameter below the top, so as to form an enlarged portion or chamber. Below this enlarged portion or chamber the diameter of the chimney is reduced, and the lower end is made so as to fit upon the lamp. *b* is a deflector. In the form shown in this figure the deflector is made of glass and is integral with the chimney proper, *a*. The chimney and deflector can be molded in a single piece at one operation. The deflector is supported in position by the connecting parts *c c*, between which are the openings *d d* for the entrance of the air. The particular form of these connecting parts can be greatly varied. The deflector is curved outwardly toward its lower end, so as to conform to the shape of the chimney proper, and thereby make a passage for the air curved or shaped like the wall of the chimney. The top of the deflector rises above the top of the chimney proper or above the openings for the admission of the air.

The air enters through the openings *d d* and is directed and guided downward by the deflector *b* and flows to the burner or place of combustion in contact with the hot products of combustion escaping through the chimney. The arrows *e e* indicate the direction of the air-current. By curving the deflector outwardly at its lower end the current of air is made to flow outwardly and to pass downward along the wall of the chimney instead of passing downward in a vertical direction and immediately on top of the burner or flame. I have found that for purposes of illumination it is better to feed the air to the flame in this manner. The products of combustion escape through the inner passage formed by the deflector *b* in the direction indicated by the arrows *f f*. The descending air is heated by the ascending products of combustion, and the two currents are mutually affected and regulated, as fully described in my earlier application.

When using my improvement with a lamp, it may be well to admit a small portion of the air from below by any suitable contrivance such as those commonly in use for this purpose.

In Fig. 2, *g* is the chimney proper. *h* is the deflector, and *i i* are the connecting parts. In this form of my improvement the chimney proper is made with straight sides, and the form of the deflector is correspondingly changed. The connecting parts *i i* are also different in construction. The operation is the same as that already explained, except that the air flows directly downward to the burner or place of combustion. The arrows *e e* denote the air-current and the arrows *f f* the current of combustion products.

In Fig. 3, *g* is a lamp-globe which operates as a chimney or flue, *h* is the deflector and *i i* are the connecting parts. *e e* are arrows denoting the entering current of air, and *f f* are arrows denoting the current of combustion products. In the form shown the lamp-globe is made in two parts for convenience, the upper part being of such a size as to fit and rest upon the lower part. The deflector increases in diameter toward its lower end, thereby conforming to the contour or shape of the globe. The operation is the same as that already explained. The air enters and passes downward along the wall of the globe to the burner or place of combustion. The products of combustion pass upward and escape through the deflector *h*.

The particular form of the chimney, deflector, and connecting parts can be greatly varied without departing from my invention.

My improved chimney or globe constitutes a new article of manufacture which can be easily and cheaply made, which can be as readily applied to any lamp or combustion apparatus as the lamp-chimneys now in use, and which will enable the user, without any adjustment or labor on his part, and at small expense, to at once carry out the method of producing combustion described in my earlier application, and thereby to gain all the advantages resulting therefrom.

What I claim as new, and desire to secure by Letters Patent, is—

1. As a new article of manufacture, a chimney or globe provided with means for causing air to flow downward within the same to the place of combustion in contact with the products of combustion, substantially as set forth.

2. As a new article of manufacture, a chimney or globe provided with a deflector for causing air to flow downward within the same to the place of combustion in contact with the products of combustion, substantially as set forth.

3. As a new article of manufacture, a chimney or globe provided with a deflector made integral therewith for causing air to flow downward within the same to the place of combustion in contact with the products of combustion, substantially as set forth.

4. As a new article of manufacture, a lamp chimney or globe made of glass provided with a glass deflector made integral therewith, substantially as set forth.

5. As a new article of manufacture, a lamp chimney or globe increasing in diameter below the top so as to form an enlarged portion or chamber and provided with a deflector increasing in diameter toward its lower end and thereby adapted to cause a current of air to enter the chimney or globe and pass downward along the sides of the chimney or globe to the place of combustion, substantially as set forth.

6. As a new article of manufacture, the lamp-chimney *a*, provided with the deflector *b* made integral therewith, substantially as set forth.

7. As a new article of manufacture, the lamp-chimney *a*, provided with the deflector *b*, and connecting parts *c c*, made integral therewith, substantially as set forth.

PAUL J. SCHLICHT.

Witnesses:
E. FRANCIS ELDREDGE,
EDWIN SEGER.